(12) United States Patent  
Ikeda et al.

(10) Patent No.: US 7,210,471 B2  
(45) Date of Patent: May 1, 2007

(54) BREATHER CHAMBER STRUCTURE FOR INTERNAL COMBUSTION ENGINE AND INTERNAL COMBUSTION ENGINE

(75) Inventors: Eiji Ikeda, Nisshin (JP); Masao Murayama, Toyota (JP); Takuo Nakayama, Toyota (JP); Yuki Nakamura, Aichi-ken (JP); Masato Soma, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 10/885,612

(22) Filed: Jul. 8, 2004

(65) Prior Publication Data

US 2005/0005921 A1    Jan. 13, 2005

(30) Foreign Application Priority Data

Jul. 11, 2003  (JP)  ............................. 2003-195543

(51) Int. Cl.  
*F01M 13/04*  (2006.01)
(52) U.S. Cl. ..................................... 123/572; 123/573
(58) Field of Classification Search ........ 123/572–574, 123/41.86  
See application file for complete search history.

(56) References Cited

U.S. PATENT DOCUMENTS

| | | | | |
|---|---|---|---|---|
| 4,597,372 A | * | 7/1986 | Furukawa | ................... 123/572 |
| 4,602,607 A | * | 7/1986 | Balsley | ....................... 123/574 |
| 4,667,647 A | * | 5/1987 | Ohtaka et al. | ............... 123/573 |
| 4,721,090 A | * | 1/1988 | Kato | ........................... 123/572 |
| 4,958,613 A | * | 9/1990 | Hiraoka et al. | ............. 123/572 |
| 5,005,553 A | * | 4/1991 | Washizu et al. | ............. 123/572 |
| 5,069,192 A | * | 12/1991 | Matsumoto et al. | ........ 123/572 |
| 6,412,478 B1 | * | 7/2002 | Ruehlow et al. | ............ 123/572 |

FOREIGN PATENT DOCUMENTS

| | | |
|---|---|---|
| JP | 6-8717 | 2/1994 |
| JP | 10-299450 | 11/1998 |
| JP | 3025861 | 1/2000 |
| JP | 2000-045749 | 2/2000 |
| JP | 2001-140626 | 5/2001 |

OTHER PUBLICATIONS

Patent Abstract of Japan, Publication No. 09-013939, dated Jan. 14, 1997.  
Chinese Office Action dated Mar. 3, 2006.

* cited by examiner

*Primary Examiner*—Marguerite McMahon  
(74) *Attorney, Agent, or Firm*—Finnegan, Henderson, Farabow, Garrett & Dunner, LLP

(57) ABSTRACT

A breather chamber is located in a blow-by gas passage to separate oil from blow-by gas. A partitioning member partitions the interior of the breather chamber into a plurality of spaces. The partitioning member is arranged such that the spaces extend along the flowing direction of the blow-by gas and that an adjacent pair of the spaces are connected at ends in the flowing direction. A separating member is provided in at least one of the spaces. The separating member obstructs the flow of the blow-by gas in the associated space, thereby separating oil from the blow-by gas. Therefore, oil is separated from the blow-by gas securely and is prevented from being brought out of the breather chamber.

15 Claims, 7 Drawing Sheets

BREATHER CHAMBER STRUCTURE FOR INTERNAL COMBUSTION ENGINE AND INTERNAL COMBUSTION ENGINE

BACKGROUND OF THE INVENTION

The present invention relates to the structure of a breather chamber for separating oil drips and oil mist from blow-by gas, which accompanies the operation of internal combustion engine. This invention also pertains to an internal combustion engine.

In a reciprocating engine in which the reciprocating motions of pistons are converted by a crank mechanism into rotary motions, blow-by gas (unburnt gas mixture and combustion gas) leaks from combustion chambers through the gaps between the pistons and cylinders. For this reason, the blow-by gas is usually returned through the air intake line into the combustion chambers to be re-combusted.

In order to prevent oil drips and oil mist contained in blow-by gas from riding on the flow of blow-by gas and being discharged, the engine is equipped with a mechanism for separating oil drips and oil mist from blow-by gas. One of such mechanisms is disclosed as a "breather device for engine" in the Japanese Patent Publication No. 3025861.

In this breather device, a valve hole is bored in a valve holder separating plate between an inlet chamber and an outlet chamber. To the outlet chamber side face of the valve holder separating plate is fitted an oil separating valve, consisting of a leaf spring, for opening and closing the valve hole. To the inlet chamber side face of the valve holder separating plate is fitted a valve hole cover, and this valve hole cover is further shielded by a throttle forming case. This structure causes part of the blow-by gas to flow through a gas passage consisting of "a section between the throttle forming case and valve hole cover", "a section between the valve hole cover and valve holder separating plate", and "the valve hole". Furthermore, intake-throttle gaps are formed in a plurality of positions on the way of the gas passage, and part of the blow-by gas flows into the gas passage via these intake-throttle gaps.

This breather device is designed to separate most of oil drips and oil mist in blow-by gas before they reach the oil separating valve by having the blow-by gas go through the gas passage and the intake-throttle gaps. It is intended to eliminate the trouble that oil sticking to the circumference of the valve hole have the oil separating valve stick tightly to the circumference of the valve hole, and also intended to eliminate the trouble that the pressure rise abruptly opens the oil separating valve and its opening force causes separated oil sticking to the circumference of the valve hole to burst into the outlet chamber.

References on the prior art relating to the present invention include, in addition to the Japanese Patent Publication No. 3025861 cited above, the Japanese Laid-Open Patent Publication No. 2001-140626, Japanese Laid-Open Utility Model Publication No. 6-8717 and Japanese Laid-Open Patent Publication No. 2000-45749.

However, in the breather device described in the Japanese Patent Publication No. 3025861, when the pressure in the inlet chamber rises sufficiently to overcome the pressing force of the oil separating valve, this oil separating valve opens. This opening of the valve causes the valve hole to be opened to let blow-by gas burst into the outlet chamber through the valve hole. On the other hand, when the bursting out of the blow-by gas reduces the pressure in the inlet chamber, the oil separating valve closes. Such opening and closing of the oil separating valve generate pressure pulsation in the inlet chamber. As the pressure pulsation makes the pressure within the gas passage lower than the pressure outside the gas passage at the inlet chamber, blow-by gas bursts into the gas passage through the intake-throttle gaps. The narrower these gaps, the higher the velocity of this bursting in. As a result, oil mist and the like in the blow-by gas is carried to the valve hole by the high velocity blow-by gas, and oil mist stick to the circumference of the valve hole, and there still remains the problem that oil mist and the like burst into the outlet chamber with the opening of the oil separating valve and are brought out into the intake line.

SUMMARY OF THE INVENTION

An object of the present invention is to provide a breather chamber structure for internal combustion engine, which is capable of separating oil from blow-by gas securely and making it difficult for it to be brought out of the breather chamber. The present invention also pertains to an internal combustion engine.

To achieve the above objective, the present invention provides a structure of a breather chamber in an internal combustion engine. The engine has a combustion chamber, a crank chamber, an intake passage connected to the combustion chamber, and a blow-by gas passage. The blow-by gas passage connects the crank chamber to the intake passage, thereby sending blow-by gas, which has leaked from the combustion chamber to the crank chamber, to the intake passage. The blow-by gas contains oil. The breather chamber is located in the blow-by gas passage to separate the oil from the blow-by gas. The structure includes a partitioning member that partitions the interior of the breather chamber into a plurality of spaces. The partitioning member is arranged such that the spaces extend along the flowing direction of the blow-by gas and that an adjacent pair of the spaces are connected at ends in the flowing direction. A separating member is provided in at least one of the spaces. The separating member obstructs the flow of the blow-by gas in the associated space, thereby separating oil from the blow-by gas.

According to another aspect of the invention, an internal combustion engine is provided. The engine includes a combustion chamber, a crank chamber, an intake passage, a blow-by gas passage, a breather chamber, a partitioning member, and a separating member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
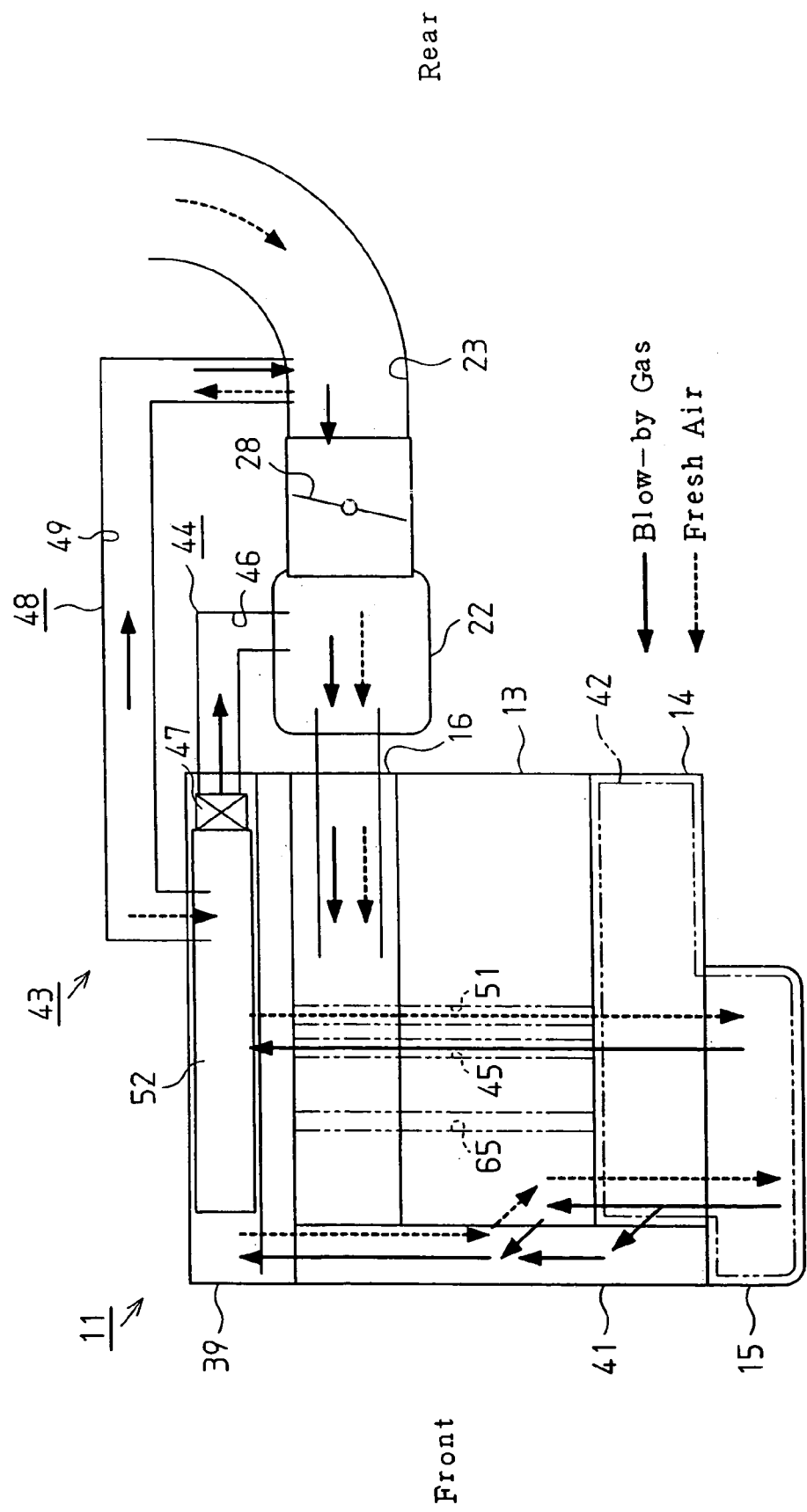
FIG. 1 is a schematic diagram of the paths of blow-by gas and fresh air in a preferred embodiment of the present invention.

In the drawings, like numerals are used for like elements throughout.

A preferred embodiment of the present invention will be described below with reference to FIG. 1 through FIG. 7.

Figure 2:
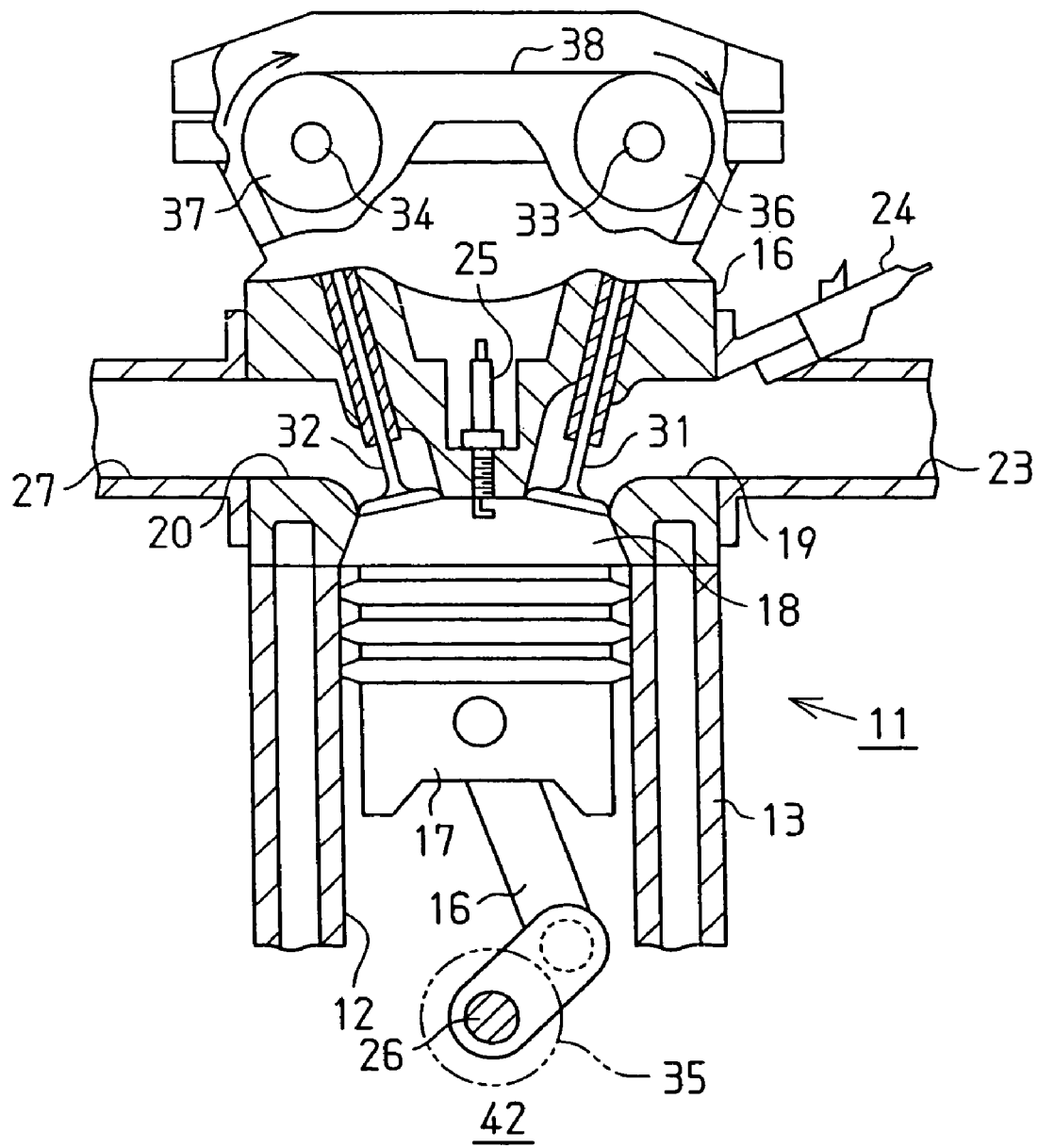
FIG. 2 shows a partial sectional view of the configuration of an engine.

As shown in FIG. 1 and FIG. 2, a vehicle is equipped with a gasoline engine 11, which is an internal combustion engine. The engine 11 is provided with a cylinder block 13 having a plurality of cylinders 12. Underneath the cylinder block 13 are fitted a crankcase 14 and an oil pan 15, and above it is fitted a cylinder head 16.

In this engine 11, air is sucked into the combustion chambers 18 of the cylinders 12 through an intake passage 23 and intake ports 19, and fuel is fed by injection through fuel injection valves 24. When the resultant mixture of fuel and air is ignited by ignition plugs 25, the mixture is combusted to reciprocate pistons 17 and thereby to turn a crankshaft 26, which is the output shaft of the engine 11. Exhaust gas resulting from the combustion of the mixture gas is discharged from the combustion chambers 18 to an exhaust passage 27 through exhaust ports 20.

Adjustment of the output of the engine 11 is achieved by controlling the aperture of a throttle valve 28 provided on the intake passage 23. Thus, by adjusting the throttle aperture, the quantity of air sucked into the engine 11 is varied, the quantity of fuel injection is controlled according to that variation, and the quantity of mixture filling the combustion chambers 18 is thereby varied to regulate the output of the engine 11.

In the engine 11, the intake ports 19 are opened and closed by intake valves 31, and the exhaust ports 20 are opened and closed by exhaust valves 32. For the operation of these intake and exhaust valves 31 and 32, there are provided an intake camshaft 33 and an exhaust camshaft 34. To the front ends (left ends in FIG. 1) of the crankshaft 26 and the intake and exhaust camshafts 33 and 34 are respectively fitted sprockets 35, 36 and 37, and over these sprockets 35 through 37 is wound a chain 38 as a transfer belt. As a result, when the crankshaft 26 rotates, that rotation is transmitted to the sprockets 36 and 37 via the sprocket 35 and the chain 38. As the intake and exhaust camshafts 33 and 34 rotate along with the rotation of the sprockets 36 and 37, the intake and exhaust valves 31 and 32 reciprocate to open or close the intake and exhaust ports 19 and 20. In order to transmit the aforementioned rotation of the crankshaft 26 to the intake and exhaust camshafts 33 and 34, timing pulleys and a timing belt may as well be used in place of the sprockets 35 through 37 and the chain 38.

Over the cylinder head 16 is fitted a head cover 39 in a state of shielding the intake and exhaust camshafts 33 and 34, the sprockets 36 and 37 and the like from above. Ahead of the cylinder head 16, the cylinder block 13, the crankcase 14 and so forth is fitted a chain cover 41 in a shape of shielding the sprockets 35 through 37, the chain 38 and the like on the front side.

In the engine 11, gas leaks from the gaps between the cylinders 12 and the pistons 17 into a crank chamber 42 in the compression and expansion strokes. This gas mainly consists of mixture leaking out in the compression stroke and combustion gas leaking out in the expansion stroke, and is referred to as blow-by gas. Since the blow-by gas degrades engine oil and is likely to corrode the inside of the engine 11, this blow-by gas is returned to (reduced in) the air intake line by a blow-by gas reduction device 43 to be re-combusted. The crank chamber 42 provides a space to accommodate the crankshaft 26; in further detail, it is a space surrounded by the crankcase 14 and the oil pan 15.

The blow-by gas reduction device 43 is provided with a blow-by gas passage 44 to link the crank chamber 42 and the intake passage 23. The blow-by gas passage 44 includes an internal gas passage 45 (only partially shown in FIG. 1) disposed inside the engine 11 and an external gas passage 46 disposed outside the engine 11. The internal gas passage 45 includes passages within the cylinder block 13, passages within the cylinder head 16, the internal space of the chain cover 41 and the internal space of the head cover 39. The external gas passage 46 is configured of a pipe linking a predetermined position, for instance the rear end, of the head cover 39 and an element downstream than a throttle valve 28 of the intake passage 23, for instance a surge tank 22. A negative pressure (a pressure lower than the atmospheric pressure) occurring downstream from the throttle valve 28 is brought to work on the crank chamber 42 via the blow-by gas passage 44. On the way of the blow-by gas passage 44, for instance in the connecting portion of the external gas passage 46 to the head cover 39, a PCV valve 47 is provided to regulate the flow rate of the blow-by gas according to the load on the engine 11.

The blow-by gas reduction device 43 is provided with an air inlet passage 48 for letting air outside the engine 11 (which may also be referred to as fresh air) into the crank chamber 42 to reduce the concentration of the blow-by gas (especially of nitrogen oxides NOx) in the crank chamber 42. The air inlet passage 48 includes an external air passage 49 disposed outside the engine 11 and an internal air passage 51 (only partially shown in FIG. 1) disposed inside the engine 11. The external air passage 49 is configured of a pipe linking an element upstream than the throttle valve 28 of the intake passage 23, for instance an air cleaner hose, to a predetermined position, for instance the rear end, of the head cover 39. In FIG. 1, the external air passage 49 is shown to be linked to the upper end of the rear part of the head cover 39 for the convenience of illustration. The internal air passage 51 includes passages within the head cover 39, passages within the cylinder head 16, passages within the cylinder block 13 and the internal space of the chain cover 41.

This blow-by gas reduction device 43 causes blow-by gas and fresh air to flow as shown in FIG. 1 according to the load on the engine 11. In FIG. 1, the arrows in solid lines represent the flow of blow-by gas and those in broken lines, the flow of fresh air. When the load on the engine 11 is light, a negative pressure downstream than the throttle valve 28 works into the crank chamber 42 via the blow-by gas passage 44. This negative pressure causes the blow-by gas in the crank chamber 42 to be sucked into the intake passage 23 via the blow-by gas passage 44, mixes with the mixture gas, and flows into the combustion chambers 18. The negative pressure causes fresh air to be sucked into the crank chamber 42 via the air inlet passage 48.

On the other hand, when the engine 11 is under a heavy load, while a negative pressure downstream than the throttle valve 28 is reduced, that is, suction of fresh air into the crank chamber 42 via the air inlet passage 48 is reduced, the quantity of blow-by gas generated increases. As a result, the blow-by gas not only flows into the part downstream of the throttle valve 28 of the intake passage 23 via the blow-by gas passage 44 but also flows up the air inlet passage 48 into the part upstream of the throttle valve 28 of the intake passage 23. In this way, when the engine 11 is under a heavy load, blow-by gas is returned to the intake passage 23 by way of two paths including the blow-by gas passage 44 and the air inlet passage 48.

Figure 3:
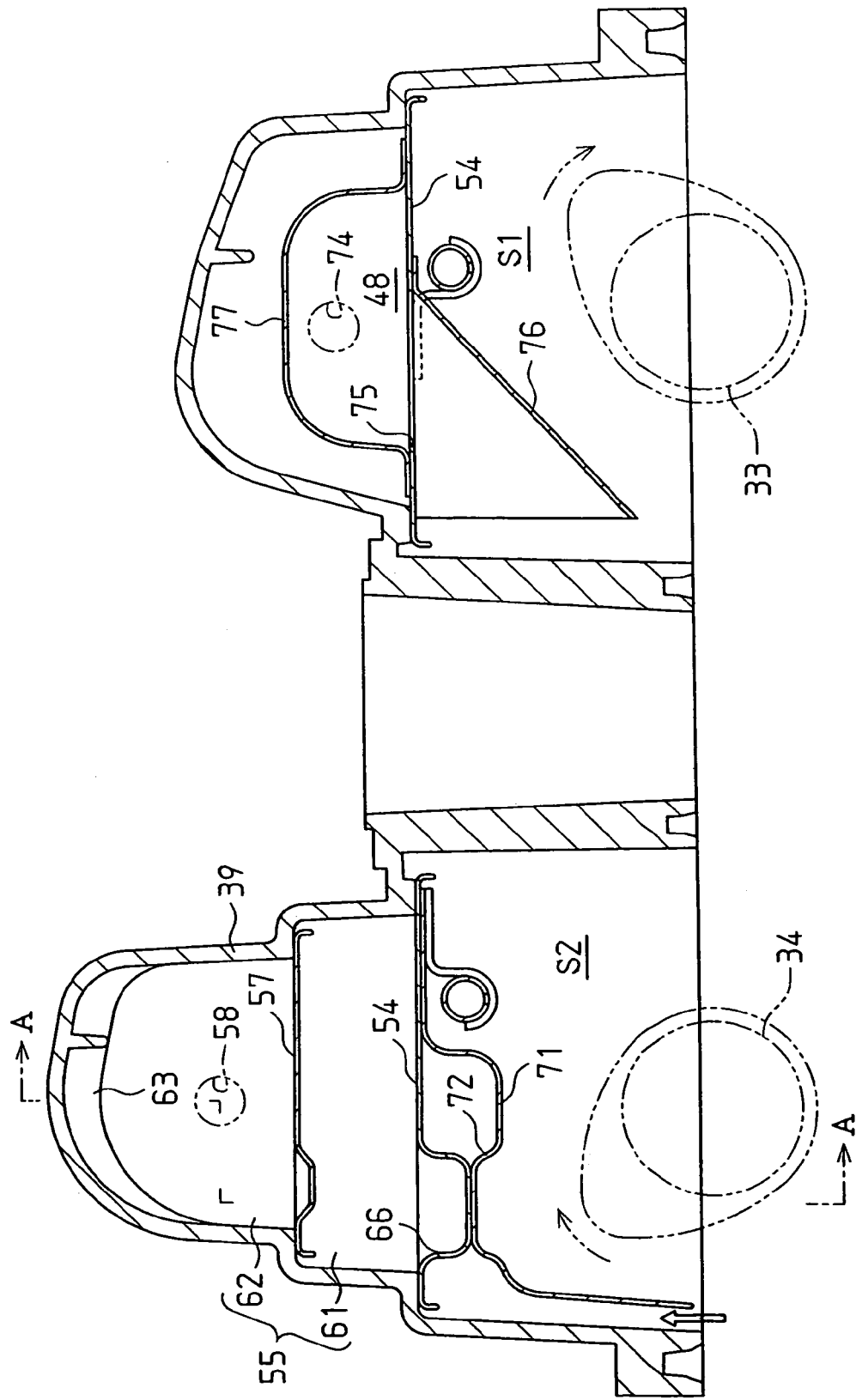
FIG. 3 shows a sectional view of the inside of a head cover.

The engine 11 is equipped with a breather device 52 for separating oil drips and oil mist contained in blow-by gas from that blow-by gas. Next will be described details of this breather device 52. As shown in FIG. 3, FIG. 4(a) and FIG. 4(b), the internal space of the head cover 39 has a sub-space S1 covering the intake camshaft 33 from above, a sub-space S2 covering the exhaust camshaft 34 from above, and a sub-space S3 covering the sprockets 36 and 37 from above. In the head cover 39, an intermediate wall 53 is disposed between the sub-spaces S1, S2 and the sub-space S3. Within the head cover 39, a metallic main plate 54 is disposed over the two sub-spaces S1 and S2. The sub-space S2 is vertically partitioned by the main plate 54, and the space above the main plate 54 constitutes a breather chamber 55. Behind the main plate 54, there is opened a gas inlet port 56 to allow blow-by gas in the space underneath the main plate 54 to flow into the breather chamber 55.

In a position away upward from the main plate 54 within the breather chamber 55 is formed a metallic auxiliary plate 57 as a partitioning member. The internal space of the breather chamber 55 is vertically partitioned by this auxiliary plate 57 into two portions. The forward end portion of the auxiliary plate 57 is slightly away backward from the intermediate wall 53 of the head cover 39, and communication between the space underneath the auxiliary plate 57 (hereinafter referred to as the lower space 61) and the space above it (hereinafter referred to as the upper space 62) is established by this portion (hereinafter referred to as the communicating portion 59). In the upper part of the rear wall of the head cover 39, there is opened a gas outlet port 58 to guide blow-by gas outside the breather chamber 55.

In a plurality of positions away from one another in the back-and-forth direction on a face (ceiling face) toward the auxiliary plate 57 of the head cover 39, there are formed reinforcing ribs 63. On the other hand, on the auxiliary plate 57 are fixed separating plates 64, formed by bending planar materials, as separating members for obstructing the flow of blow-by gas in the upper space 62. In this embodiment of the invention, a plurality of separating plates 64 are arranged in positions away from one another in the back-and-forth direction on the auxiliary plate 57 to intervene between adjacent reinforcing ribs 63. The reinforcing ribs 63 are disposed essentially as parts of the head cover 39, but not specially for the breather chamber structure in this embodiment of the invention.

Figure 4:
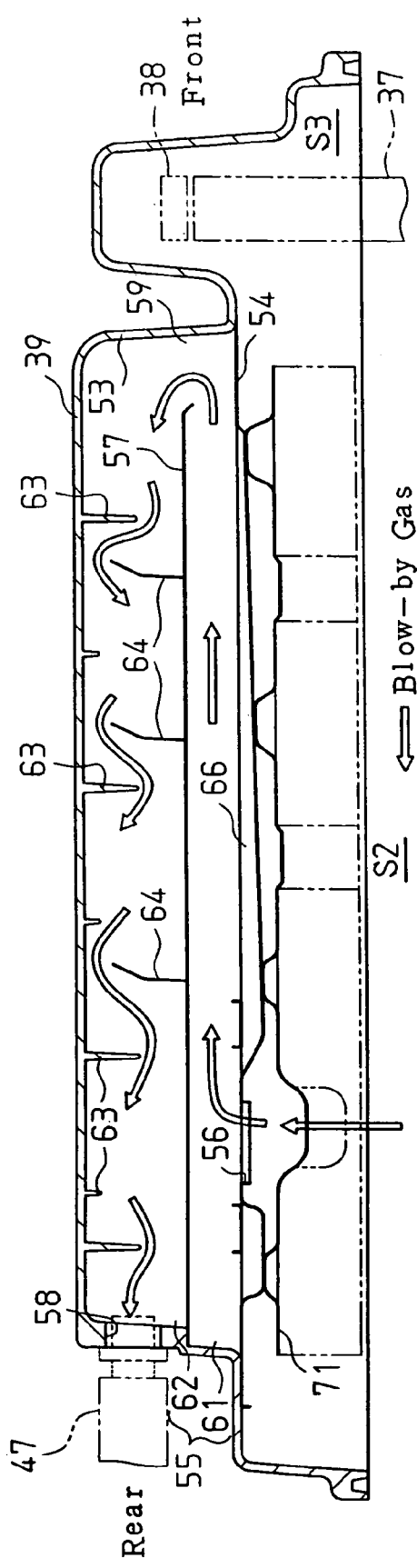
FIG. 4(a) shows a sectional view along line A—A in FIG. 3.
FIG. 4(b) shows an enlarged view of a main plate and a cam cover in FIG. 4(a)
Figure 4:
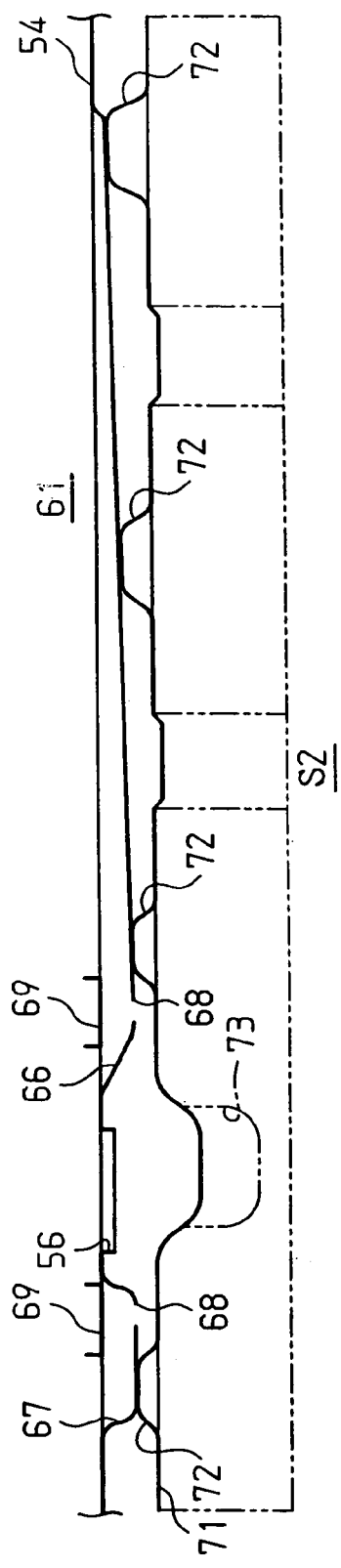
Figure 5:
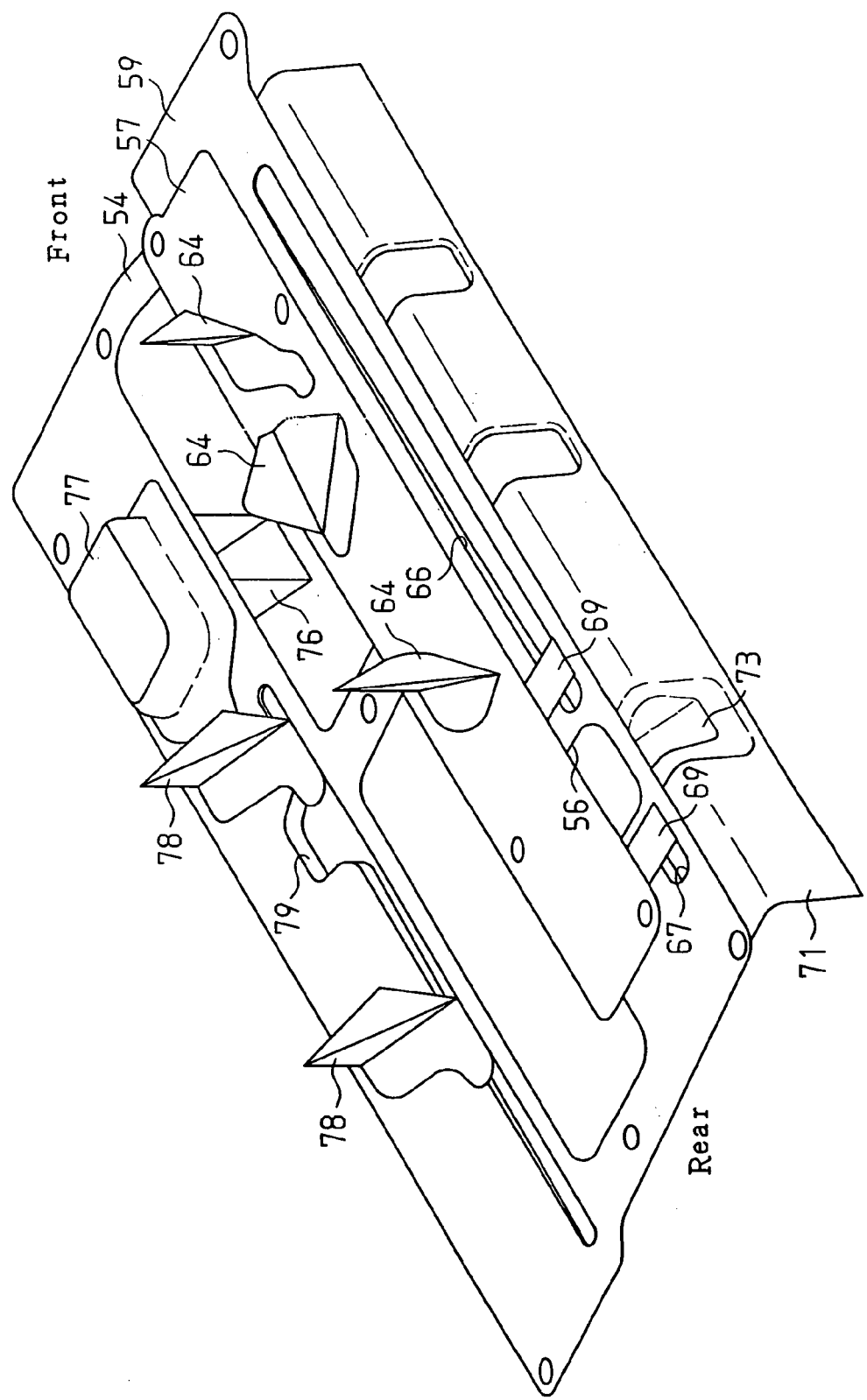
FIG. 5 shows a perspective view of the main and auxiliary plates and cam cover from behind.
Figure 6:
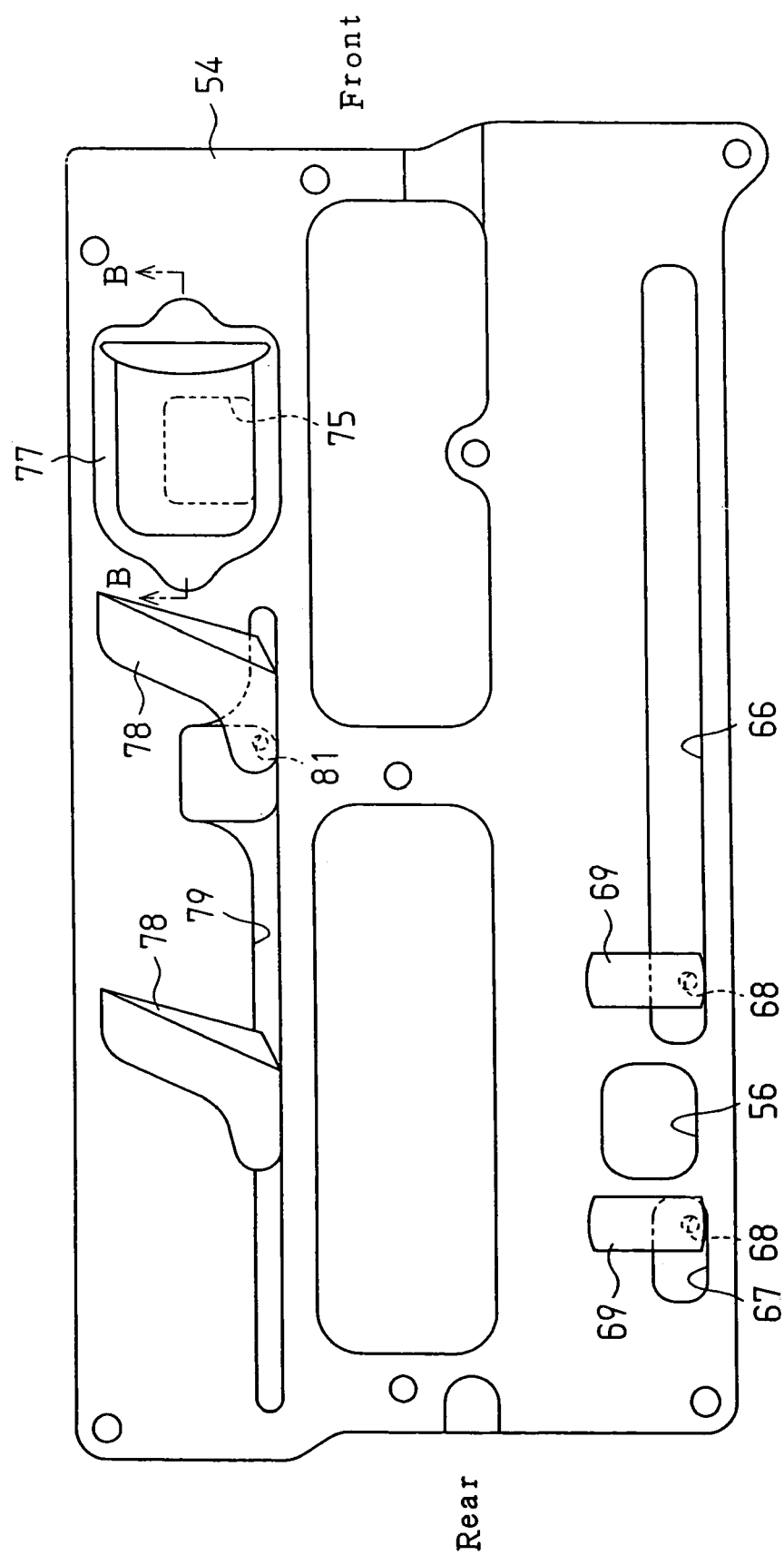
FIG. 6 shows a plan of the main plate.

In order to return the oil separated from blow-by gas in the breather chamber 55 to the crank chamber 42, an oil return passage 65 (see FIG. 1) is disposed in the cylinder head 16 and the cylinder block 13. As shown in FIG. 4 through FIG. 6, the main plate 54 is provided with oil receivers 66 and 67 for accumulating the separated oil. The oil receivers 66 and 67 are formed by depressing the metallic plate constituting the main plate 54 by plastic machining such as deep drawing or the like. In this embodiment of the invention, two oil receivers 66 and 67 are disposed in two positions, forward and backward, with the gas inlet port 56 in-between. The oil receiver 66 ahead of the gas inlet port 56 is shaped like a gutter, thin and long in the back-and-forth direction. The bottom of this oil receiver 66 is so inclined as to be deeper toward the rear end. Therefore, to form the oil receiver 66 in such a shape, the main plate 54 is depressed greater (deeper) toward the rear end by plastic machining. By contrast, the oil receiver 67 behind the gas inlet port 56 is shorter than the oil receiver 66 ahead. This oil receiver 67, unlike the oil receiver 66, has substantially the same depth in any position.

In the bottoms of both oil receivers 66 and 67 are bored oil chute holes 68. In particular, the forward oil chute hole 68 is bored in the rearmost part, namely the deepest part, of the oil receiver 66.

In the main plate 54, near the upper part of each oil chute hole 68 is disposed an oil entrance preventing section 69. The oil entrance preventing sections 69 prevent oil in the crank chamber 42 from entering the breather chamber 55 through the oil chute holes 68. In this example, the oil entrance preventing sections 69 are formed by weld-fixing planar materials to the main plate 54.

Further, as shown in FIG. 3 through FIG. 5, between the main plate 54 and the exhaust camshaft 34 is disposed a cam cover 71 consisting of a metallic plate and covering the exhaust camshaft 34. The cam cover 71 prevents oil splashed by the exhaust camshaft 34 as it rotates from entering the breather chamber 55 together with blow-by gas. In the upper part of this cam cover 71 are formed convexes 72 in a plurality of positions matching the oil receivers 66 and 67. The "positions matching" are positions underneath the oil receivers 66 and 67 where no oil chute holes 68 are bored. These convexes 72 are formed by plastic machining of the cam cover 71. The convexes 72 are joined to the oil receivers 66 and 67 by welding or otherwise. This joining contributes to increasing the rigidity of the main plate 54 through the oil receivers 66 and 67. The convexes 72 matching the forward oil receiver 66 are formed along that oil receiver 66 in a plurality of (three in this embodiment) positions away from one other in the back-and-forth direction. Since the oil receiver 66 is deeper toward the rear end as stated above, of the convexes 72 to be joined to the oil receiver 66, what is positioned foremost is the greatest in the extent of rising from the upper face of the cam cover 71, and what is positioned backward is correspondingly smaller in this respect.

As shown in FIG. 4(b) and FIG. 5, in the part of the cam cover 71 near the area underneath the gas inlet port 56 is formed a concave 73 by partial plastic machining of the cam cover 71. This concave 73 makes it easier for blow-by gas to flow into the gas inlet port 56 by widening the gap between the main plate 54 and the cam cover 71 in the vicinity of the gas inlet port 56.

Figure 7:
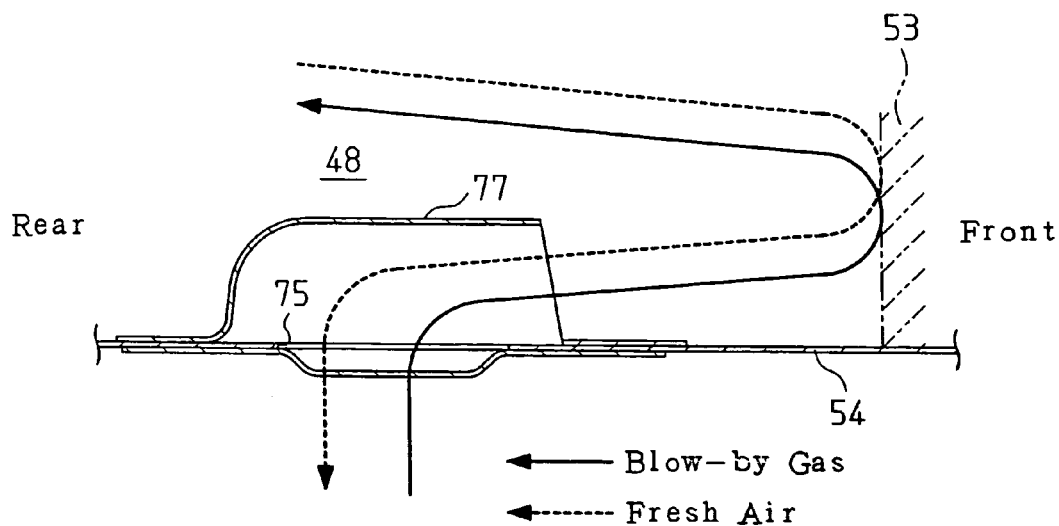
FIG. 7 shows a sectional view along line B—B in FIG. 6.

It was already stated that the main plate 54 is arranged within the head cover 39. As shown in FIG. 3 and FIG. 5, the sub-space S1 covering the intake camshaft 33 within the head cover 39 is partitioned into two parts, upper and lower, by a main plate 54. The main plate 54 functions as a separation wall, which separates the head cover 39 and the intake camshaft 33 from each other. The air inlet passage 48 includes a channel defined by the head cover 39 and the main plate 54. In the rear wall of the head cover 39 is opened an air inlet port 74 (see FIG. 3), which establishes communication between the inside and outside of the sub-space S1. As shown in FIG. 6 and FIG. 7, an air outlet port 75 is bored in the forward part of the main plate 54 and somewhat away backward from the intermediate wall 53 of the head cover 39.

On the other hand, as shown in FIG. 3 and FIG. 5, an oil entrance preventing cover 76 is disposed on the lower face of the main plate 54 and between the air outlet port 75 and the intake camshaft 33. The cover 76 is open only on the other face (the left side in FIG. 3) than the intake camshaft 33. This open structure prevents oil splashed upward as the intake camshaft 33 rotates from entering into the space above the main plate 54 through the air outlet port 75 without interrupting the flow of fresh air or blow-by gas.

A direction changing cover 77 is disposed on the upper face of a main plate 54 and around the air outlet port 75. The direction changing cover 77 is open only on the front face, which is toward the intermediate wall 53 of the head cover 39 (see FIG. 7).

As shown in FIG. 5 and FIG. 6, the main plate 54 is provided with separating plates 78 as separating members for separating oil mist from blow-by gas passing within the sub-space S1, an oil receiver 79 for accumulating the separated oil, and an oil chute hole 81 for letting the accumulated oil fall.

Next will be described the actions of this embodiment of the invention configured as described above.

As a negative pressure in the surge tank 22 of the intake passage 23 works on the crank chamber 42 via the blow-by gas passage 44 when the engine 11 is under a light to medium load, blow-by gas in the crank chamber 42 is returned to the intake passage 23 through the blow-by gas passage 44 and the breather chamber 55. In this process, within the head cover 39, blow-by gas first flows between the cam cover 71 and the head cover 39 (see the arrow in FIG. 3). This blow-by gas passes the concave 73 of the cam cover 71 and the gas inlet port 56 in this sequence as shown by arrows in FIG. 4(a), and flows into the rear part of the lower space 61 of the breather chamber 55. In the forward part of the engine 11, an air flow containing oil is generated in the vicinity of the chain 38 along with the turning of that chain 38. However, since the gas inlet port 56 is disposed in the rear part of the main plate 54, a position relatively far from the chain 38, the gas inlet port 56 is hardly affected by the air flow containing oil.

The blow-by gas having flowed into the lower space 61 flows forward along the main plate 54 and auxiliary plate 57 and, when reaching their forward ends, hits against the intermediate wall 53 of the head cover 39. Passing the communicating portion 59 between the auxiliary plate 57 and the intermediate wall 53, the blow-by gas shifts to the upper space 62, and flows backward along the auxiliary plate 57. In the process of passing the upper space 62, while being obstructed by the reinforcing ribs 63 and the separating plates 64, the blow-by gas alternately passes along the separating plates 64 and the reinforcing ribs 63. Since the separating plates 64 protrude upward from the auxiliary plate 57 and the reinforcing ribs 63 hang down from the ceiling face of the head cover 39, the blow-by gas passes the upper space 62 while meandering up and down. When reaching the rear end of the upper space 62, the blow-by gas is guided from the breather chamber 55 to the external gas passage 46 through the gas outlet port 58.

In the process for blow-by gas to pass the lower space 61, oil drips contained in that blow-by gas are separated by being stuck to the wall faces of the head cover 39, the upper face of the main plate 54 and the lower face of the auxiliary plate 57. In the process for blow-by gas to pass the upper space 62, oil drips contained in that blow-by gas are separated by being stuck to the upper wall of the auxiliary plate 57, the wall faces of the head cover 39, the reinforcing ribs 63 and the separating plates 64. Thus, oil drips are separated in this process for blow-by gas to pass the long passage.

When blow-by gas passes the upper space 62, oil mist contained in that blow-by gas is separated from blow-by gas by being stuck to the separating plates 64 and the reinforcing ribs 63.

Oil separated from blow-by gas in the process for blow-by gas to pass the lower space 61 and the upper space 62 of the breather chamber 55 is collected into the oil receivers 66 and 67 of the main plate 54. The collected oil drops through the oil chute holes 68 and is returned to the crank chamber 42 through the oil return passage 65 (see FIG. 1).

The oil chute holes 68 essentially returns to the crank chamber 42 oil separated from blow-by gas and accumulated in the oil receivers 66 and 67. However, the pressure in the breather chamber 55 may become so lower than the pressure in the crank chamber 42 that oil might tend to enter the breather chamber 55 from the crank chamber 42 through the oil chute holes 68. Against this, the oil would hit the oil entrance preventing section 69 in the vicinity of the upper part of the oil chute holes 68, and be thereby prevented from entering into the breather chamber 55 any further. The oil having hit the oil entrance preventing section 69 is returned to the oil receivers 66 and 67 and eventually dropped through the oil chute holes 68.

Although oil is splashed upward as the exhaust camshaft 34 rotates, this oil falls or flows down when it hits the cam cover 71. Accordingly, the splashed oil is restrained from directly entering into the breather chamber 55 through the gas inlet port 56.

When the engine 11 is under a light to medium load, the negative pressure in the surge tank 22 also works on the air inlet passage 48 via the crank chamber 42. This negative pressure causes air upstream than the throttle valve 28 in the intake passage 23 to be sucked into the crank chamber 42 through the air inlet passage 48. When this air passes the air inlet passage 48, the air flows in the sub-space S1, which is a space covering the intake camshaft 33 in the head cover 39. In detail, this fresh air flows into a space higher than the main plate 54 from the air inlet port 74 at the rear end of the head cover 39, and flows forward along that main plate 54. When the fresh air reaches the forward end of the higher space, the air is reversed as it hits the intermediate wall 53 of the head cover 39 as indicated by the broken line arrow in FIG. 7, passes the direction changing cover 77 and the air outlet port 75 in that sequence, and shifts into a space lower than the main plate 54. After that, the fresh air flows through the internal air passage 51 within the cylinder head 16, the cylinder block 13 and so forth, and is guided to the crank chamber 42.

When the chain 38 turns, for instance, in the direction represented by arrows in FIG. 2, along with the operation of the engine 11, an air flow in a direction matching the position of that chain 38 is generated. The sub-space S1 covering the intake camshaft 33, out of the internal space of the head cover 39, becomes a space in which the surrounding air is stirred down along with the turning of the chain 38 while the sub-space S2 covering the exhaust camshaft 34 becomes a space in which the surrounding air is stirred up.

In this embodiment of the invention, as stated above, the air outlet port 75, which constitutes part of the air inlet passage 48, is positioned in the sub-space S1 where air is stirred down. Moreover, this air outlet port 75 is disposed in the forward part of the main plate 54, which is near the chain 38. As a result, in its process of flowing in the air inlet passage 48, especially the internal air passage 51, that fresh air is sucked by the air flow generated around the chain 38 when it flows in the air outlet port 75 and its vicinities. Therefore, a greater quantity of air is accepted into the crank chamber 42 than when the air outlet port 75 is disposed in a different position from the aforementioned.

When the engine 11 is under a heavy load, since the throttle valve 28 is wide open, the negative pressure generated downstream than the throttle valve 28 is reduced. That is, suction of fresh air into the crank chamber 42 via the air inlet passage 48 is reduced. As a result, part of blow-by gas in the crank chamber 42 may flow back the air inlet passage 48 as represented by the solid line arrow in FIG. 7 (in the direction reverse to fresh air). Though the blow-by gas tends to flow into a space higher than the main plate 54 through the air outlet port 75, it is prevented by the direction changing cover 77 from flowing upward. The flowing direction of the blow-by gas is forced by the direction changing cover 77 to turn forward. This redirected blow-by gas is reversed as it hits against the intermediate wall 53 of the head cover 39, flows backward along the main plate 54, and flows outside the head cover 39 through the air inlet port 74. At the time of this hitting against the intermediate wall 53, oil drips and oil mist are separated from the blow-by gas.

In the above-described process in which blow-by gas flows backward, oil drips and oil mist contained in that blow-by gas are separated by being stuck to the wall faces of the head cover 39, the upper face of the main plate 54 and the separating plates 78. The separated oil is collected into the oil receiver 79 of the main plate 54, and returned to the crank chamber 42 by being dropped through the oil chute hole 81.

This embodiment of the invention has the following advantages.

(1) By arranging the auxiliary plate 57 in addition to the main plate 54, the inside of the breather chamber 55 is partitioned into two spaces (the lower space 61 and the upper space 62), and communication between the two spaces 61 and 62 is established by the communicating portion 59 at the forward end of the spaces 61 and 62. This two-tiered structure of the breather chamber 55 serves to secure a sufficient passage length for blow-by gas in the limited space within the head cover 39 and makes possible separation of a greater quantity of oil drips.

The separating plates 64 are disposed over the auxiliary plate 57. For this reason, when blow-by gas passes the upper space 62, by having the separating plates 64 obstruct the flow of that blow-by gas, it is made possible to stick oil mist to the separating plates 64 and thereby separate it.

Not only can oil drips be separated in the breather chamber 55 having such a great passage length, but also can oil mist be separated by the separating plates 64, with the result that the quantities of oil drips and oil mist brought out of the breather chamber 55 (brought-out quantities) are reduced.

(2) Although the separating plates 64 are effective for the separation of oil mist, they themselves pose resistance to ventilation. This means a risk that if the separating plates 64 are excessively provided, the resistance to ventilation may become too high, thereby the pressure in the breather chamber 55, particularly in the section close to the gas outlet port 58 may become so lower than the pressure in the crank chamber 42 that the separated oil is sucked into the intake passage 23.

In this respect, as this embodiment of the invention has its separating plates 64 only in the upper space 62, it is easier to keep the resistance to ventilation low by appropriately selecting the number of the separating plates 64 than where they are disposed in both the lower space 61 and the upper space 62. Therefore, while separating oil drips and oil mist from blow-by gas, it is made difficult for that separated oil to be sucked into the intake passage 23.

(3) Unlike according to the prior art, no oil separating valve consisting of a leaf spring is used, nor is used a structure which allows blow-by gas to pass intake-throttle gaps. For this reason, no pressure pulsation is generated due to the opening/closing of the prior art oil separating valve, nor does pressure pulsation invite suction of oil mist through intake-throttle gaps. This feature also contributes to reducing brought-out quantities of oil out of the breather chamber 55.

(4) The separating plates 64 are disposed in the same space (the upper space 62) as the existing reinforcing ribs 63. These reinforcing ribs 63, like the separating plates 64, obstruct the flow of blow-by gas besides increasing the rigidity of the head cover 39. Therefore, the number, size and shape of the separating plates 64 can be simplified as much as the contribution of the reinforcing ribs 63.

(5) The separating plates 64 are disposed between adjacent reinforcing ribs 63. As a result, by having the separating plates 64 and the reinforcing ribs 63 cause blow-by gas to pass the upper space 62 while meandering up and down, oil mist is separated from blow-by gas securely.

(6) By plastic machining of the metallic plate constituting the main plate 54, which is a plate-like member, to make part of the main plate 54 depress, the oil receivers 66 and 67, which are oil collecting portions, can be formed relatively simply. By plastic machining of the metallic plate constituting the cam cover 71 to make part of the cam cover 71 protrude upward, the convexes 72 can be formed relatively simply.

(7) The oil receiver 66 ahead of the gas inlet port 56 is shaped like a gutter. This oil receiver 66 and the oil receiver 67 behind the gas inlet port 56 constitute oil receiving parts over the substantially full length of the main plate 54 in the back-and-forth direction. By virtue of their presence, from whatever position of the breather chamber 55 in the back-and-forth direction oil may drop, the oil can be collected in either of the oil receivers 66 and 67 securely.

(8) In the main plate 54, the oil entrance preventing section 69 is provided in the vicinity of an upper part of each oil chute hole 68. As a result, even if the pressure in the breather chamber 55 may become so lower than the pressure in the crank chamber 42 that oil might tend to enter the breather chamber 55 from the crank chamber 42 through the oil chute holes 68, the oil entrance is obstructed by the oil entrance preventing section 69.

(9) The cam cover 71 is disposed between the exhaust camshaft 34 and the main plate 54. For this reason, even if oil is splashed upward as the exhaust camshaft 34 rotates, the splashed oil is restrained from directly entering into the breather chamber 55 by obstructing the oil with the cam cover 71.

(10) By joining the cam cover 71 to the oil receivers 66 and 67, the rigidity of the main plate 54 is increased. As a result, it is made difficult for the main plate 54 to vibrate, thereby restraining the occurrence of shrill sounds.

(11) As the oil receivers 66 and 67 are formed by plastic machining, the depth of the oil receivers 66 and 67 is inevitably limited. On the other hand, a structure of joining the oil receivers 66 and 67 to the cam cover 71 is used. Therefore, if the top face of the cam cover 71 is flat, even if the oil receivers 66 and 67 are formed as deep as practicable, the oil receivers 66 and 67 may come off the cam cover 71.

By contrast in this embodiment of the invention, the convexes 72 are formed by subjecting the part of the cam cover 71, which consists of a planar material, matching the oil receivers 66 and 67 to plastic machining. For this reason, the cam cover 71 is securely joined to the oil receivers 66 and 67 with these convexes 72.

(12) The air outlet port 75 is formed ahead of the main plate 54 in the space covering the intake camshaft 33 defined by the head cover 39, namely the space in which rotation of the chain 38 stirs down the surrounding air. The air outlet port 75 is near the chain 38. By virtue of this arrangement, the air flowing the air outlet port 75 and vicinities of the air outlet port 75 is sucked by a air flow generated by the rotation of the chain 38, and the quantity of fresh air let into the crank chamber 42 is increased.

(13) In the vicinity of the chain 38, an air flow containing oil arises along with the turning of that chain 38. Should the gas inlet port 56 of the breather chamber 55 be positioned in the vicinity of the chain 38, it would be more susceptible to the influence of the air flow containing oil. In this respect, since the gas inlet port 56 is disposed in the rear part of the main plate 54 far away from the chain 38 in this embodiment of the invention, the impact of this air flow is reduced. Therefore, the breather chamber 55 is prevented from receiving an excessive amount of oil.

(14) The direction changing cover 77 is positioned in the vicinity of the air outlet port 75 on the upper face of the main plate 54, and the part (forward part) of the direction changing cover 77 toward the intermediate wall 53 is made open (see FIG. 7). By virtue of this arrangement, when blow-by gas flows back the air inlet passage 48 through the air outlet port 75 under the heavy load on the engine 11, direction of the blow-by gas is altered by the direction changing cover 77 to cause the blow-by gas to hit against the intermediate wall 53 thereby to separate oil drips and oil mist from the blow-by gas.

(15) The oil entrance preventing cover 76 is disposed in the vicinity of the air outlet port 75 in the under face of the main plate 54 (see FIG. 3). As a result, oil splashed upward along with the turning of the intake camshaft 33 is restrained from entering into the space above the main plate 54 through the air outlet port 75 without interrupting the flow of fresh air or blow-by gas.

The invention may be embodied in the following forms.

The breather chamber 55 may be partitioned in some other direction than the vertical, for instance the horizontal direction, into two or more spaces to be structured as a breather chamber in which adjacent spaces communicate with each other at their ends.

The inside of the breather chamber 55 may be partitioned in the vertical direction into three or more spaces and enable adjacent spaces to communicate with each other at their ends. In this arrangement, separating plates 64 are provided in at least one of the spaces.

The separating plates 64 in the above-described embodiment may as well be arranged in the lower space 61, instead of the upper space 62. In this arrangement, the separating plates 64 may be disposed either on the under face of the auxiliary plate 57 or on the top face on the main plate 54.

In the above-described embodiment, the separating plates 64 may as well be further arranged in the lower space 61, in addition to the upper space 62. In this arrangement, however, it is essential to so set the number, size and shape of the separating plates 64 as not to allow the resistance of the separating plates 64 to ventilation to become too high.

Figure 8:
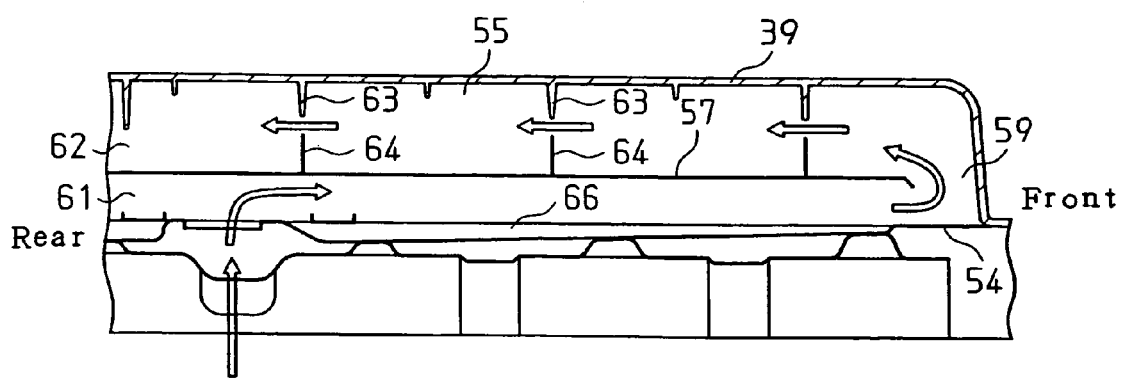
FIG. 8 is a diagram matching FIG. 4(a) and shows a sectional view of a separating plate, which is another preferred embodiment of the invention.

As shown in FIG. 8, the separating plates 64 may as well be disposed underneath the reinforcing ribs 63. In this arrangement, on account of the aforementioned positional relationship between the separating plates 64 and the reinforcing ribs 63, the passage would become smaller in the parts where the separating plates 64 and the reinforcing ribs 63 are disposed than elsewhere. This enables the gaps between the separating plates 64 and the reinforcing ribs 63 to serve as throttles, so that oil mist can be separated when blow-by gas passes these gaps.

A plurality each of separating plates 64 and reinforcing ribs 63 may be provided, and some of the separating plates 64 be arranged underneath the reinforcing ribs 63 with the rest of the separating plates 64 being disposed between mutually adjoining reinforcing ribs 63 and 63.

The oil receiver 66 ahead of the gas inlet port 56 may as well be shaped not like a gutter, and can be replaced with a shorter one like the oil receiver 67 behind. In this case, it is preferable for a plurality of oil receivers 66 to be disposed in the back-and-forth direction.

Although the separating plates 64 formed by bending planar materials are used as separating members in the above-described embodiment, the shape and other features of separating members may be altered as appropriate as long as they obstruct the flow of blow-by gas.

The present examples and embodiments are to be considered as illustrative and not restrictive and the invention is not to be limited to the details given herein, but may be modified within the scope and equivalence of the appended claims.

The invention claimed is:

1. A structure of a breather chamber in an internal combustion engine, the engine having a combustion chamber, a crank chamber, an intake passage connected to the combustion chamber, a head cover, and a blow-by gas passage, the blow-by gas passage connecting the crank chamber to the intake passage, thereby sending blow-by gas, which has leaked from the combustion chamber to the crank chamber, to the intake passage, wherein the blow-by gas contains oil, and the breather chamber is located in the blow-by gas passage to separate the oil from the blow-by gas, the structure comprising:

a plate-like member disposed in the head cover, the breather chamber being defined over the plate-like member;

an auxiliary plate that partitions the interior of the breather chamber into upper and lower spaces communicating at ends thereof with the blow-by gas flowing in a flow direction sequentially through the upper and lower spaces; and a separating plate that is provided in at least one of the upper and lower spaces, wherein the separating plate obstructs the flow of the blow-by gas in the associated space, thereby separating oil from the blow-by gas, wherein the engine has a crankshaft, an intake camshaft, an exhaust camshaft, a transfer belt for transferring rotation of the crankshaft to the intake camshaft and the exhaust camshaft, the head cover for covering the intake camshaft and the exhaust camshaft from above, and an air inlet passage for drawing air outside of the engine to the crank chamber, and wherein the head cover defines a sub-space in which the intake camshaft is located and a sub-space in which the exhaust camshaft is located, wherein one of the sub-spaces is an air stirring down space in which surrounding air is stirred down along with turning of the belt, and part of the air stirring down space that is located in the vicinity of the belt forms part of the air inlet passage.

2. The structure according to claim 1, wherein each space extends horizontally, and the auxiliary plate extends horizontally.

3. The structure according to claim 1, wherein the upper space is defined by part of the head cover and the auxiliary plate located in the head cover, and wherein the separating plate is provided on the partitioning member, and wherein a rib for reinforcing the head cover is provided on a surface of the head cover that faces the auxiliary plate.

4. The structure according to claim 3, wherein the separating plate is provided below the reinforcing rib.

5. The structure according to claim 3, wherein the reinforcing rib is one of a plurality of reinforcing ribs, and wherein the separating plate is provided between an adjacent pair of the reinforcing ribs.

6. The structure according to claim 1, wherein the engine has the head cover covering the transfer belt from above, and a separation wall separating the head cover and the camshaft from each other, and
wherein the air inlet passage includes a channel defined by the head cover and the separation wall, the separation wall having an air outlet port for sending air from the channel to the crank chamber, wherein a direction changing cover is provided in the channel to cover the air outlet port, the head cover having an intermediate wall for separating the camshafts and the belt from each other, and wherein the direction changing cover opens toward the intermediate wall.

7. The structure according to claim 6, wherein a separating plate is provided in the channel, and wherein, when blow-by gas in the crank chamber flows back to the channel, the separating plate separates oil from the blow-by gas.

8. The structure according to claim 1,
wherein a gas inlet port for taking the blow-by gas into the breather chamber is provided in the breather chamber at a position away from the transfer belt.

9. A structure of a breather chamber in an internal combustion engine, the engine having a combustion chamber, a crank chamber, an intake passage connected to the combustion chamber, a head cover, and a blow-by gas passage, the blow-by gas passage connecting the crank chamber to the intake passage, thereby sending blow-by gas, which has leaked from the combustion chamber to the crank chamber, to the intake passage, wherein the blow-by gas contains oil, and the breather chamber is located in the blow-by gas passage to separate the oil from the blow-by gas, the structure comprising:
a plate-like member disposed in the head cover, the breather chamber being defined over the plate-like member;
an auxiliary plate that partitions the interior of the breather chamber into a plurality of spaces, wherein the auxiliary plate is arranged such that the spaces extend along the flowing direction of the blow-by gas and that an adjacent pair of the spaces are connected at ends in the flowing direction; and
a separating plate that is provided in at least one of the spaces, wherein the separating plate obstructs the flow of the blow-by gas in the associated space, thereby separating oil from the blow-by gas,
wherein the spaces are arranged vertically,
wherein the bottom of the lowermost one of the spaces is formed with the plate-like member, the plate-like member having an oil collecting portion dented downward, wherein the oil collecting portion collects oil that has been separated from the blow-by gas, an oil chute hole being formed in the oil collecting portion, wherein the oil collected by the oil collecting portion falls through the oil chute hole,
wherein the engine has a crankshaft, an intake camshaft, an exhaust camshaft, a transfer belt for transferring rotation of the crankshaft to the intake camshaft and the exhaust camshaft, the head cover for covering the intake camshaft and the exhaust camshaft from above, and an air inlet passage for drawing air outside of the engine to the crank chamber, and wherein the head cover defines a sub-space in which the intake camshaft is located and a sub-space in which the exhaust camshaft is located, wherein one of the sub-spaces is an air stirring down space in which surrounding air is stirred down along with turning of the belt, and part of the air stirring down space that is located in the vicinity of the belt forms part of the air inlet passage.

10. The structure according to claim 9, wherein the oil collecting portion is formed by subjecting the plate-like member to plastic machining.

11. The structure according to claim 9, wherein an oil entrance preventing section is provided in the vicinity of an upper part of the oil chute hole, wherein the oil entrance preventing section prevents oil in the crank chamber from entering the breather chamber through the oil chute hole due to a difference between a pressure in the crank chamber and a pressure in the breather chamber.

12. The structure according to claim 9, wherein the engine has a camshaft located lower than the bottom of the lowermost space, wherein a cam cover is provided between the bottom and the camshaft to cover the camshaft, the camshaft cover being joined to part of the plate-like member that forms the oil collecting portion.

13. The structure according to claim 12, wherein the plate-like member is a first plate-like member, wherein the cam cover is formed of a second plate-like member, part of the second plate-like member is subjected to plastic machining such that the part protrudes upward, and wherein the protruding part of the second plate-like member is joined to the part of the first plate-like member that forms the oil collecting portion.

14. An internal combustion engine, comprising:
a combustion chamber;
a crank chamber;
an intake passage connected to the combustion chamber;
a head cover;
a blow-by gas passage, the blow-by gas passage connecting the crank chamber to the intake passage, thereby sending blow-by gas, which has leaked from the combustion chamber to the crank chamber, to the intake passage, wherein the blow-by gas contains oil;
a breather chamber located in the blow-by gas passage to separate the oil from the blow-by gas;
a plate-like member disposed in the head cover, the breather chamber being defined over the plate-like member;
an auxiliary plate that partitions the interior of the breather chamber into upper and lower spaces communicating with one another at ends thereof, the flow-by gas flowing through the spaces sequentially; and
a separating plate that is provided in at least one of the upper and lower spaces, wherein the separating plate obstructs the flow of the blow-by gas in the associated space, thereby separating oil from the blow-by gas,
a crankshaft,
an intake camshaft,
an exhaust camshaft, a transfer belt for transferring rotation of the crankshaft to the intake camshaft and the exhaust camshaft, the head cover covering the intake camshaft and the exhaust camshaft from above, and
an air inlet passage for drawing air outside of the engine to the crank chamber,
wherein the head cover defines a sub-space in which the intake camshaft is located and a sub-space in which the exhaust camshaft is located, wherein one of the sub-spaces is an air stirring down space in which surrounding air is stirred down along with turning of the belt, and part of the air stirring down space that is located in the vicinity of the belt forms part of the air inlet passage.

15. The engine according to claim 14, wherein the upper space is defined by part of the head cover and the auxiliary plate located in the head cover, wherein a plurality of ribs for reinforcing the head cover are provided on a surface of the head cover that faces the partitioning member, and wherein the separating plate is provided between an adjacent pair of the reinforcing ribs and also provided on the auxiliary plate.

* * * * *

UNITED STATES PATENT AND TRADEMARK OFFICE
CERTIFICATE OF CORRECTION

| | |
|---|---|
| PATENT NO. | : 7,210,471 B2 |
| APPLICATION NO. | : 10/885612 |
| DATED | : May 1, 2007 |
| INVENTOR(S) | : Eiji Ikeda et al. |

It is certified that error appears in the above-identified patent and that said Letters Patent is hereby corrected as shown below:

In claim 14, column 14, line 50, "flow-by" should read --blow-by--.

Signed and Sealed this

Fourth Day of September, 2007

JON W. DUDAS
*Director of the United States Patent and Trademark Office*